United States Patent
Oran

(10) Patent No.: US 10,200,300 B2
(45) Date of Patent: Feb. 5, 2019

(54) MAINTAINING NAMED DATA NETWORKING (NDN) FLOW BALANCE WITH HIGHLY VARIABLE DATA OBJECT SIZES

(71) Applicant: Cisco Technology, Inc., San Jose, CA (US)

(72) Inventor: Dave Oran, Cambridge, MA (US)

(73) Assignee: Cisco Technology, Inc., San Jose, CA (US)

( * ) Notice: Subject to any disclaimer, the term of this patent is extended or adjusted under 35 U.S.C. 154(b) by 60 days.

(21) Appl. No.: 15/398,293

(22) Filed: Jan. 4, 2017

(65) Prior Publication Data

US 2017/0118136 A1    Apr. 27, 2017

Related U.S. Application Data

(63) Continuation of application No. 14/514,695, filed on Oct. 15, 2014, now Pat. No. 9,577,949.

(Continued)

(51) Int. Cl.
*H04L 12/26* (2006.01)
*H04L 12/925* (2013.01)
(Continued)

(52) U.S. Cl.
CPC ............. *H04L 47/722* (2013.01); *H04L 43/16* (2013.01); *H04L 47/32* (2013.01); *H04L 47/74* (2013.01);
(Continued)

(58) Field of Classification Search
CPC ......... H04L 47/36; H04L 47/10; H04L 69/16; H04L 69/166; H04L 43/10; H04L 47/14; H04L 1/0001; H04L 1/0002; H04L 1/1628
See application file for complete search history.

(56) References Cited

U.S. PATENT DOCUMENTS 7,460,472 B2 * 12/2008 Le ................... H04L 1/0001
  370/229
7,483,376 B2 * 1/2009 Banerjee ............ H04L 47/10
  370/235

(Continued)

OTHER PUBLICATIONS

Ghali et al., "Secure Fragmentation for Content-Centric Networks", Cornell University Library, May 12, 2014, http://arxiv.org/pdf/1405.2861v1.pdf, 13 pages.

(Continued)

*Primary Examiner* — Sai Aung
(74) *Attorney, Agent, or Firm* — Edell, Shapiro & Finnan, LLC

(57) ABSTRACT

A network device in a Named Data Networking (NDN) network receives an Interest from a consumer including a name and an Expected Data Size of data requested through the Interest. The network device forwards the Interest along a path to a producer of the data based on the name. As a result, the network device receives data that has traversed the path in reverse and satisfies the forwarded Interest. The network device determines an actual data size of the received data. The network device compares the actual data size to the Expected Data Size. If the actual data size is greater than the expected data size, and if a level of traffic congestion associated with forwarding the received data to the consumer is below a threshold, forwarding the received data to the consumer along a path based on the name of the data.

20 Claims, 7 Drawing Sheets

Related U.S. Application Data

(60) Provisional application No. 62/035,636, filed on Aug. 11, 2014.

(51) Int. Cl.
*H04L 29/08* (2006.01)
*H04L 12/823* (2013.01)
*H04L 12/911* (2013.01)

(52) U.S. Cl.
CPC ............ *H04L 67/32* (2013.01); *H04L 67/327* (2013.01); *H04L 43/0876* (2013.01)

(56) References Cited

U.S. PATENT DOCUMENTS

| | | | |
|---|---|---|---|
| 8,121,135 B2* | 2/2012 | Thathapudi | H04L 47/10 370/252 |
| 8,576,847 B2* | 11/2013 | Hegde | H04L 43/10 370/392 |
| 2004/0071140 A1 | 4/2004 | Jason et al. | |
| 2005/0041635 A1* | 2/2005 | Chung | H04L 47/10 370/351 |
| 2011/0032935 A1* | 2/2011 | Yang | H04L 47/10 370/389 |
| 2011/0060831 A1 | 3/2011 | Ishii et al. | |
| 2011/0305143 A1 | 12/2011 | Gray et al. | |
| 2012/0051236 A1* | 3/2012 | Hegde | H04L 43/10 370/252 |
| 2014/0164640 A1* | 6/2014 | Ye | H04L 47/12 709/235 |
| 2016/0043963 A1 | 2/2016 | Oran | |

OTHER PUBLICATIONS

Wang et al., "An Improved Hop-by-hop Interest Shaper for Congestion Control in Named Data Networking", Aug. 12, 2013, http://conferences.sigcomm.org/sigcomm/2013/papers/icn/p55.pdf, pp. 55-60.

Zhang et al., "Named Data Networking (NDN) Project", Oct. 31, 2010, http://named-data.net/techreport/TR001ndn-proj.pdf, 26 pages.

Zhang et al., "Named Data Networking", Jun. 8, 2014, 8 pages.

* cited by examiner

MAINTAINING NAMED DATA NETWORKING (NDN) FLOW BALANCE WITH HIGHLY VARIABLE DATA OBJECT SIZES

CROSS-REFERENCE TO RELATED APPLICATION

This application is a continuation application of U.S. Non-Provisional application Ser. No. 14/514,695, filed on Oct. 15, 2014, which claims priority to U.S. Provisional Application No. 62/035,636, filed Aug. 11, 2014, the entireties of which are incorporated herein by reference.

TECHNICAL FIELD

The present disclosure relates to Named Data Networking (NDN) and Content-Centric Networking (CCN).

BACKGROUND

Flow control/balance in conventional Named Data Networking (NDN) leads to a tendency to make the size of the data objects carried in NDN Data messages relatively small (usually on the order of a link Maximum Transmission Unit (MTU)) and near constant, because flow balance can then be maintained using simple bookkeeping to track the number of Interest messages that are outstanding at any given time. While simple, constraining Data messages to be small disadvantageously constrains data flow and introduces other deleterious effects.

DESCRIPTION OF EXAMPLE EMBODIMENTS

Overview

Figure 1:
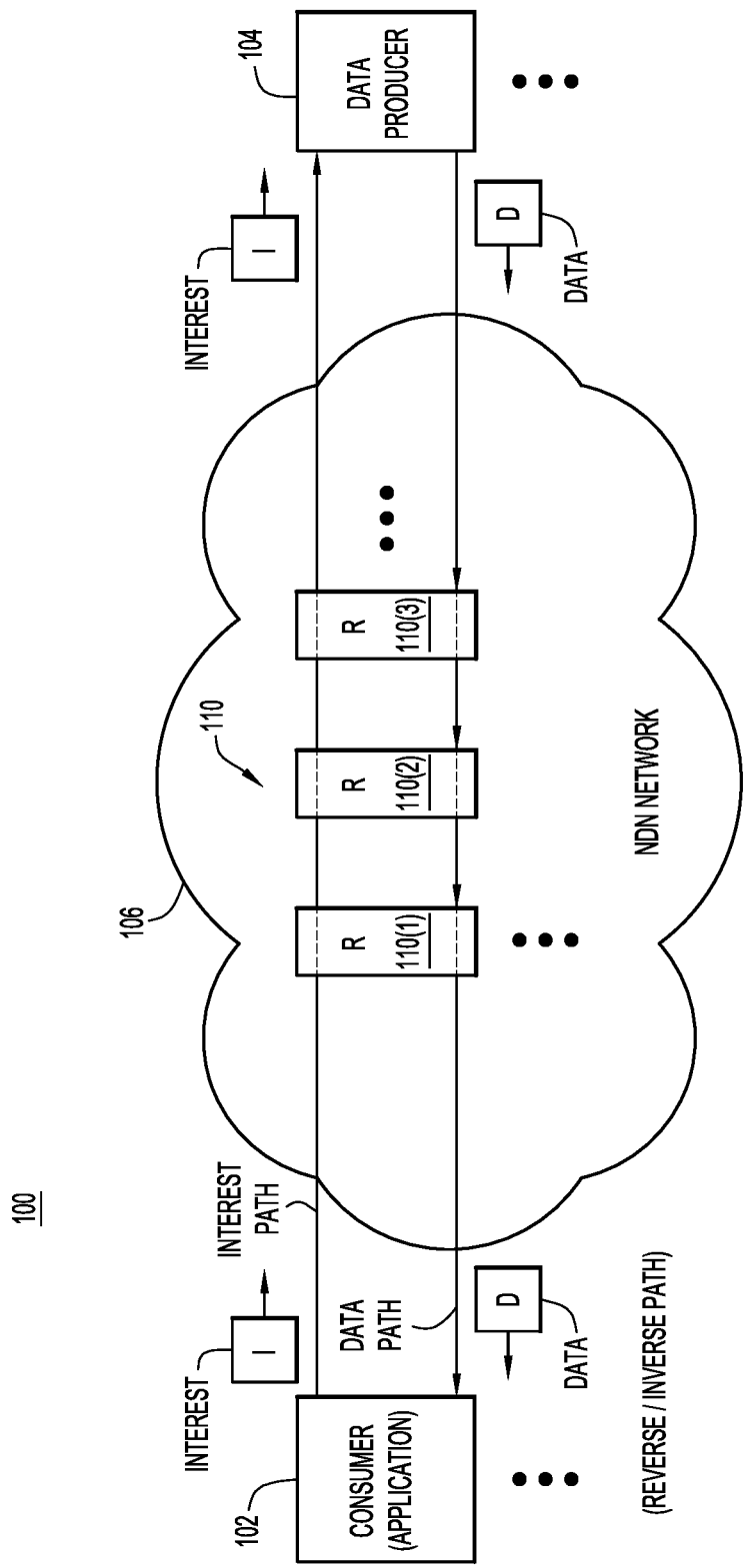
FIG. 1 is a diagram of an example Named Data Networking (NDN) and Content-Centric Networking (CCN) (collectively referred to herein simply as "NDN") environment in which NDN flow balancing embodiments may be implemented, according to an example embodiment.

Embodiments presented herein may be performed in a network device among a plurality of network devices in a Named Data Networking (NDN) network or a Content-Centric Networking (CCN) network (collectively, an NDN network). In one embodiment, the network device receives an Interest from a consumer including a name and an Expected Data Size of data requested through the Interest. The network device forwards the Interest along a path to a producer of the data based on the name. As a result, the network device receives data that has traversed the path in reverse and satisfies the forwarded Interest. The network device determines an actual data size of the received data. The network device compares the actual data size to the Expected Data Size. If the compare indicates the actual data size is greater than the expected data size, and if a level of traffic congestion associated with forwarding the received data to the consumer is below a threshold, the network device forwards the received data to the consumer along a path based on the name of the data.

In another embodiment, the network device receives multiple Interests at a face among multiple faces of the network device. Each Interest requests data by name and including an expected data size of the requested data. The network device determines whether the multiple Interests include the same name but different expected data sizes for the data. If the multiple Interests include the same name but different expected data sizes for the data, the network device performs an action with respect to the multiple Interests.

Example Embodiments

Deeply embedded in some Information-Centric Networking (ICN) architectures, especially Named Data Networking (NDN) and Content-Centric Networking (CCN), is the notion of flow balance. Flow balance captures the idea that there is a one-to-one correspondence between requests for data, carried in Interest messages, and the responses with the requested data object, carried in Data messages. This has a number of highly beneficial properties for flow and congestion control in networks, as well as some desirable security properties, such as preventing attackers from injecting large amounts of un-requested data into the network.

This approach leads to a desire to make the size of the data objects carried in Data messages small and near constant, because flow balance can then be kept using simple bookkeeping of how many Interest messages are outstanding. While simple, limiting Data messages to be quite small—usually on the order of a link Maximum Transmission Unit (MTU)—has some constraints and deleterious effects, among which may include:

a. Such small data objects are inconvenient for many applications; their natural data object sizes can be considerably larger than a link MTU;
  b. Applications with truly small data objects (e.g. voice payloads in an Internet telephony application) have no way to communicate the size of the small data objects to the network, causing resources to still be allocated for MTU-sized data objects; and
  c. When chunking a larger data object into multiple Data messages, each message has to be individually cryptographically hashed and signed, increasing both computational overhead and overall message header size.

One approach which may help with the last of these effects is to employ fragmentation where a Data message larger than the Path MTU (PMTU) is carved into smaller pieces for transmission over the link(s). There are three types of fragmentation: end-to-end, hop-by-hop with reassembly at every hop, and hop-by-hop with cut-through of individual fragments. A number of ICN protocol architectures incorporate fragmentation and schemes have been proposed for NDN and CCN. Fragmentation alone does not ameliorate the flow balance problem however, since from a resource allocation standpoint both memory and link bandwidth must be set aside for maximum-sized data objects to avoid congestion collapse under overload.

The above approaches do not handle arbitrarily large data objects (e.g. hundreds of kilobytes or larger). As the dynamic range of data object sizes becomes very large, finding the right tradeoff between handling a large number of small data objects versus a single very large data object when allocating networking resources, e.g., link bandwidth and buffer resources, becomes intractable. Further, the semantics of Interest-Data exchanges means that any error in the exchange results in a re-issue of an Interest for the entire data object. Very large data objects represent a performance problem because the cost of retransmission when Interests are retransmitted (or re-issued) becomes extremely high. Therefore, certain embodiments of this disclosure may address a dynamic range of data object sizes from very small (e.g., a fraction of a link MTU) to moderately large, e.g., about 64 kilobytes or equivalently about 40 Ethernet packets, and assumes an associated fragmentation scheme to handle link MTUs that cannot carry the data object in a single link-layer packet. These object sizes are provided as examples only; the present disclosure contemplates any suitable object size.

Certain embodiments maintain flow balance under the conditions outlined above by allocating resources accurately based on data object size, rather than employing conventional Interest counting embodiments. The embodiments may be implemented in an NDN environment described below.

FIG. 1 illustrates an example diagram of an environment 100 in which NDN and CCN flow balancing embodiments presented herein may be implemented. Such embodiments apply equally to both NDN and CCN (which base packet switching and/or routing on a name of content in a packet) and, for convenience, both NDN and CCN are referred to more generally/collectively as "NDN" in the ensuing description. NDN environment 100 includes at least one consumer application 102 (also referred to simply as "consumer" 102 or "requestor" 102) to request data, at least one data producer 104 to store and produce the data responsive to the requests, and an NDN network 106 including multiple network nodes/devices 110 (e.g., nodes (110(1), 110(2), and 110(3)) to route the data requests and data between the consumer application and the data producer. Network nodes 110 may be network routers or switches, for example.

In NDN environment 100, communication between consumer 102, data producer 104, and nodes 110 NDN may include exchanges of two types of packets or other messages: Interest (I) and Data (D). Both types of packets/messages carry a name that identifies a piece of data (i.e., a data object) that can be transmitted in one Data packet. Consumer 102 puts the name of a desired data object into an Interest and sends the Interest to producer 104 along an Interest or forward path through NDN network 106. Nodes 110 use this name to forward the Interest toward data producer 104 along the Interest path. Paths between adjacent nodes 110 are referred to as "path links" or simply "links."

If the Interest reaches one of nodes 110 that has the requested data already stored therein (for example, because of a previous request for the same data object), the node 110 will return a Data packet that contains the data object back to consumer 102 along a Data path. The Data packet includes the name of the data/content together with a signature by the producer's key that binds the name to the content. If no node 110 includes the data to satisfy the Interest, the Interest will be forwarded all the way to producer 104, and producer 104 will return the requested Data via network 106. The one of either the node 110 or producer 104 that returns the requested data is referred to herein as the "data responder" with respect to the Interest. The returned Data follows in reverse the Interest path back to consumer 102. Thus, the Data path is also referred to as the "reverse path" or the "inverse path" of the Interest/forward path. The forwarding of the Interest along the Interest path and of the Data along the reverse path by each node 110 is based on the name of the data, not source and destination addresses as used, e.g., with Internet Protocol (IP) routing.

The manner in which congestion control can be implemented in NDN/CCN (e.g., in NDN environment 110) is discussed briefly. Unlike the IP family of protocols, which rely on end-to-end congestion control (e.g. TCP, DCCP, SCTP), NDN employs hop-by-hop congestion control. In certain embodiments, there is per-Interest/Data state at every hop (router) of the path, which may allow, for each outstanding Interest, bandwidth for data returning on the inverse path to be allocated. One way to do this is to make the allocation using simple Interest counting—by accepting one Interest packet from an upstream node, implicitly this provides a guarantee (either hard or soft) that there is sufficient bandwidth on the inverse direction of the link to send back one Data packet.

To deal with a larger dynamic range of data object size, link bandwidth and buffer sizes for Data messages may be allocated in bytes with an upper bound larger than a Path MTU (PMTU) and a lower bound lower than a single link MTU. Since resources are allocated for returning Data based on arriving Interests, it may be advantageous to provide this information in the Interests.

Therefore, certain embodiments presented herein include an "Expected Data Size" control field in each Interest. This may allow each node on the path taken by the Interest to accurately allocate bandwidth on the inverse path for the returning Data message. Also, by including the Expected Data Size, in certain embodiments the weight in resource allocation of large versus small data objects can be controlled, which may maintain fairness across relatively large and small data objects. The simpler scheme was nominally "fair" on a per-exchange basis within the variations of data that fit in a single PMTU sized packet because all Interests produced similar amounts of data in return. In the absence of such a field, it is infeasible to allow large dynamic range in data object size. Example Interest and Data packets/messages are described below in connection with FIGS. 2A and 2B.

Figure 2A:
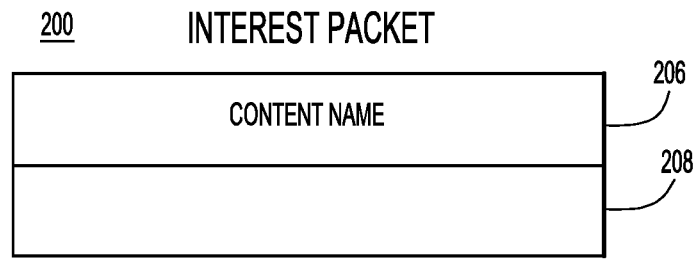
FIG. 2A is an illustration of an example Interest packet, according to an example embodiment.

With reference to FIG. 2A, there is an illustration of an example of an Interest packet 200 (i.e., Interest 200) formatted to support the embodiments presented herein. Interest 200 includes: a content name 206 of the requested data; and an expected or estimated size 208 of the requested data, referred to as "Expected Data Size" 208. In certain embodiments, Interest 200 may also include a selector. In a given Interest that traverses NDN network nodes 110, Expected Data Size 208 in the Interest indicates to each of nodes a level of node resources, e.g., link bandwidth and buffer sizes, that the node will need to allocate to satisfy the Interest, i.e., route the named data object back to consumer 102.

Figure 2B:
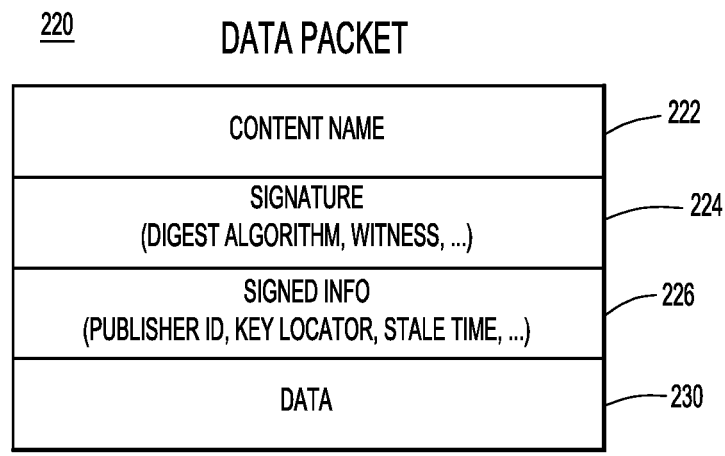
FIG. 2B is an illustration of an example Data packet, according to an example embodiment.

With reference to FIG. 2B, there is an illustration of an example of a Data packet 220 (i.e., Data 220). Data 220 includes: content name 222 for the data contained in the Data; a signature 224, signed information 226; and data or content 230 carried in the Data. Data 220 may also include a field containing an actual size of the data 230 ("Actual Data Size").

In certain embodiments, inclusion of the Expected Data Size in each Interest assumes that the requester (e.g., consumer application 102) knows or can estimate/determine how big the corresponding data object coming back will be. For a number of applications, the size is known a priori due to the characteristics of the application. Here are some examples:

a. For many sensor and other networked device applications, such as Internet-of-Things applications, the data is instrument readings which have fixed known size;

b. In video streaming, the data is output of a video encoder which produces variable sized frames. This information is typically made available ahead of time to the streaming clients in the form of a Manifest, which contains the names of the corresponding segments (or individual frames) of video and audio and their sizes; and c. Internet telephony applications use vocoders that typically employ fixed-size audio frames. Therefore, their size is known either a priori, or via an initialization exchange at the start of an audio session.

More complex cases arise where the data size is not known at the time the Interest must be sent. Certain embodiments presented herein address how mismatches between the Expected Data Size and the actual size of the data object returned are accommodated. The consumer may either under- or over-estimate the data size. In the former case, the under-estimate can lead to congestion and possible loss of data. In the latter case, bandwidth that could have been used by other data objects might be wasted. First to be considered are "honest" mis-estimates due to imperfect knowledge by the NDN application; next to be considered are malicious applications that are using the network machinery to either get an unfair share of the resources or mount some form of attack. Also to be considered are the effects of Interest aggregation if the aggregated Interests have differing Expected Data Size. It is also noted that from the perspective of the requesting application, if the Data message arrives, the application then learns the data object's actual size, which may or may not be useful in adjusting the Expected Data Size estimate for future Interests.

Before the above-mentioned flow balance embodiments based on Expected Data Size are described in detail, an example architecture and operation of one of network nodes 110 in which the embodiments may be implemented is described with reference to FIGS. 3-5.

Figure 3:
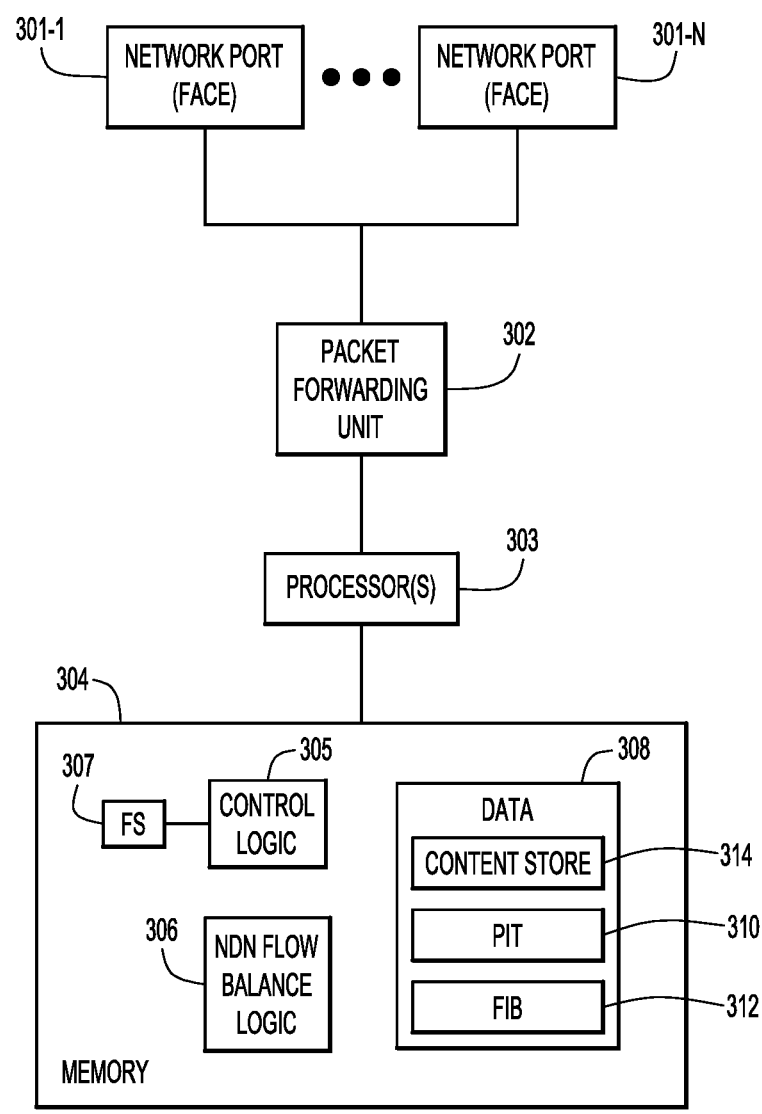
FIG. 3 is a block diagram of an example NDN network device/node configured to operate according to the example embodiments presented herein.
Figure 4:
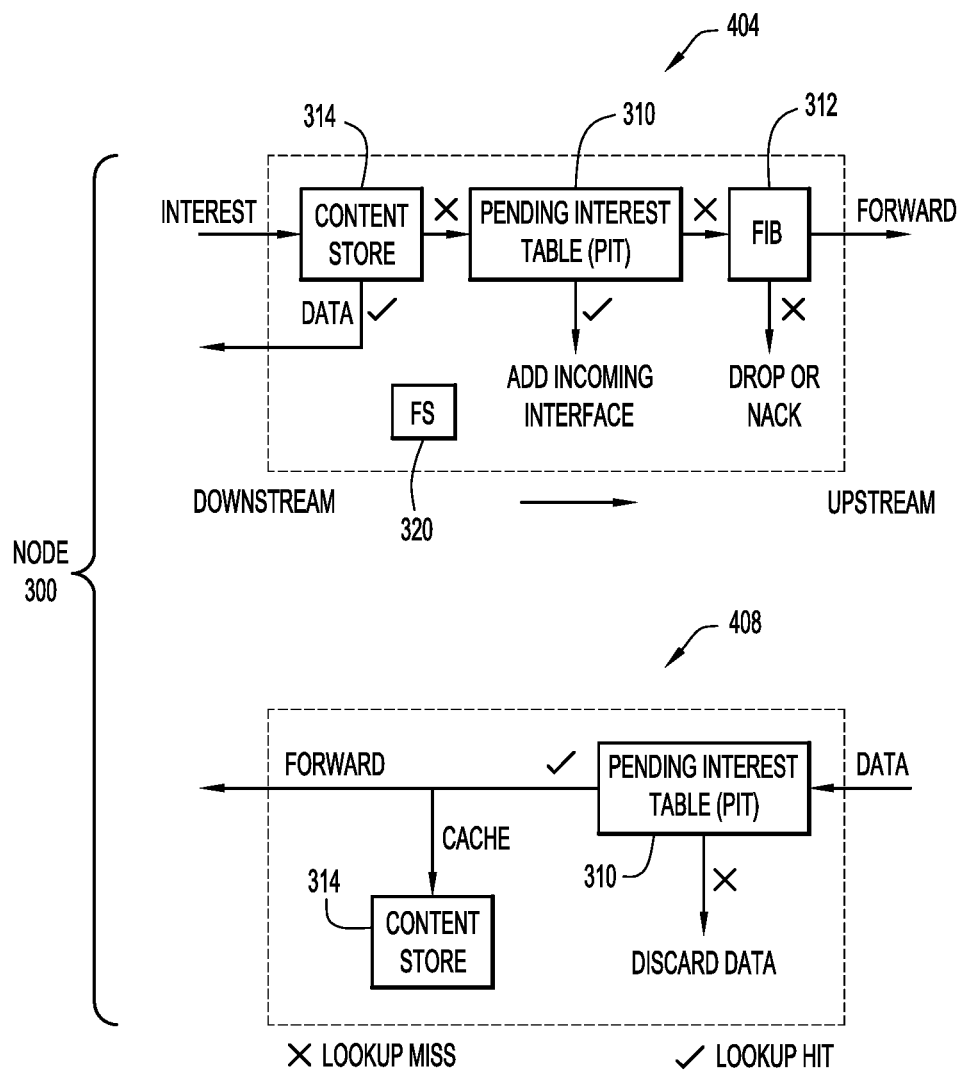
FIG. 4 is a block diagram of example Interest and Data flow paths through the NDN network node of FIG. 3, according to an example embodiment.

Reference is now made to FIG. 3, which is a block diagram of an example NDN node or device 300 representative of each of NDN nodes 110 in network environment 100. NDN node 300 may be a network device, such as a router or switch, that has Interest and Data packet forwarding capabilities as well as computing/data processing capabilities to implement flow balance embodiments. To this end, NDN node 300 comprises a plurality of network ports or faces 301-1 through 301-N (also referred to as "interfaces") to receive and forward/transmit Interests and Data packets, a packet forwarding unit 302 to route the Interest and Data packets between the network ports/faces, a processor 303 (or multiple processors) and memory 304.

Memory 304 may comprise read only memory (ROM), random access memory (RAM), magnetic disk storage media devices, optical storage media devices, flash memory devices, electrical, optical, or other physical/tangible (non-transitory) memory storage devices. The processor 303 is, for example, a microprocessor or a microcontroller that executes instructions stored in memory. Thus, in general, memory 304 may comprise one or more tangible computer readable storage media (e.g., a memory device) encoded with software comprising computer executable instructions and when the software is executed (by the processor 304) it is operable to perform the operations described herein. For example, memory 304 stores Control logic 305 to provide overall control of network node 300 and NDN Flow Balance logic 306 to implement flow balance embodiments based on Expected Data Size. Either Control logic 305 or NDN Flow Balance logic 306 may include a Forwarding Strategy (FS) module 307 that operates in conjunction with packet forwarding unit 302 to implement an adaptive forwarding strategy, which determines whether, when, and where to forward each Interest packet.

Memory 304 also stores data 308 produced and/or used by logic 305-307. In certain embodiments, Data 308 includes one or more of the following data structures:

a. A Pending Interest Table (PIT) 310 to store entries for pending/received Interests that have not yet been satisfied, where each entry includes the data name carried in the Interest together with node incoming and outgoing faces/interfaces traversed by the Interest;

b. A Forwarding Information Base (FIB) 312 to store a name-prefix based routing protocol; and c. A Content Store (CS) 314 to cache or store Data that has been retrieved from a data responder (e.g., data producer 104 or other one of upstream nodes 110) in a most recent Interest/Data retrieval cycle, or has already been retrieved in a previous data retrieval cycle.

PIT 310 and FIB 312 together store state information, including node ingress and egress face information, for each Interest received and sent by NDN node 300 while traversing their respective paths in network 100 so that Data satisfying the Interest may trace the same path in reverse back to consumer 102 (i.e., the inverse path).

The general operation of NDN node 300 is now described with reference to FIGS. 3 and 4. FIG. 4 shows an Interest flow 404 through NDN node 300 in an upstream or forward direction from consumer 102 to producer 104, and a resulting Data flow 408 through the node in a downstream or reverse/inverse direction. When an Interest arrives at NDN node 300, the node checks Content Store 314 for matching data; if matching data exists the node returns the Data packet on the interface/face of the node from which the Interest came. Otherwise node 300 looks up the name in PIT 310, and if a matching entry exists, it simply records the incoming interface of this Interest in the PIT entry. In the absence of a matching PIT entry, node 300 will forward the Interest toward the data producer 104 via an outgoing interface (which is also recorded in the node) based on information in FIB 312 as well as the node's adaptive forwarding strategy as implemented by Forwarding Strategy module 320. When NDN node 300 receives multiple Interests for the same name from the downstream nodes, in one embodiment the node may forward only the first of the received Interests upstream toward data producer 104, and drop the other duplicative Interests. FIB 312 is populated by a name-prefix based routing protocol, and can have multiple output interfaces for each prefix.

Forwarding Strategy module 320 may decide to drop or negatively acknowledge an Interest in certain situations, e.g., if all upstream links are congested or the Interest is suspected to be part of a malicious attack. For each Interest, Forwarding Strategy module 320 may retrieve the longest-prefix matched entry from FIB 312, and decides when and where to forward the Interest. Content Store 314 is a temporary cache of Data packets node 300 has received. Because a Data packet is meaningful independent of where it comes from or where it is forwarded, it can be cached to satisfy future Interests.

When a Data packet arrives at NDN node 300, then node may find the matching PIT entry and forward the data to all downstream interfaces/faces listed in that PIT entry. NDN node 300 may remove that PIT entry, and optionally caches the Data in Content Store 314. Data packets always take the reverse path of Interests, and, in the absence of packet losses, one Interest packet results in one Data packet that satisfies the Interest on each link, providing flow balance. To fetch large content objects that comprise multiple packets, Interests provide a similar role in controlling traffic flow as TCP ACKs in the Internet: a fine-grained feedback loop controlled by the consumer of the data. Neither Interest nor Data packets carry any host or interface addresses; NDN routes forward Interest packets toward data producers based on the names carried in the packets, and forward Data packets to consumers based on the PIT state information set up by the Interests at each hop. This Interest/Data packet exchange symmetry induces a hop-by-hop control loop, and may reduce or eliminate the need for source or destination addresses in data delivery.

Figure 5:
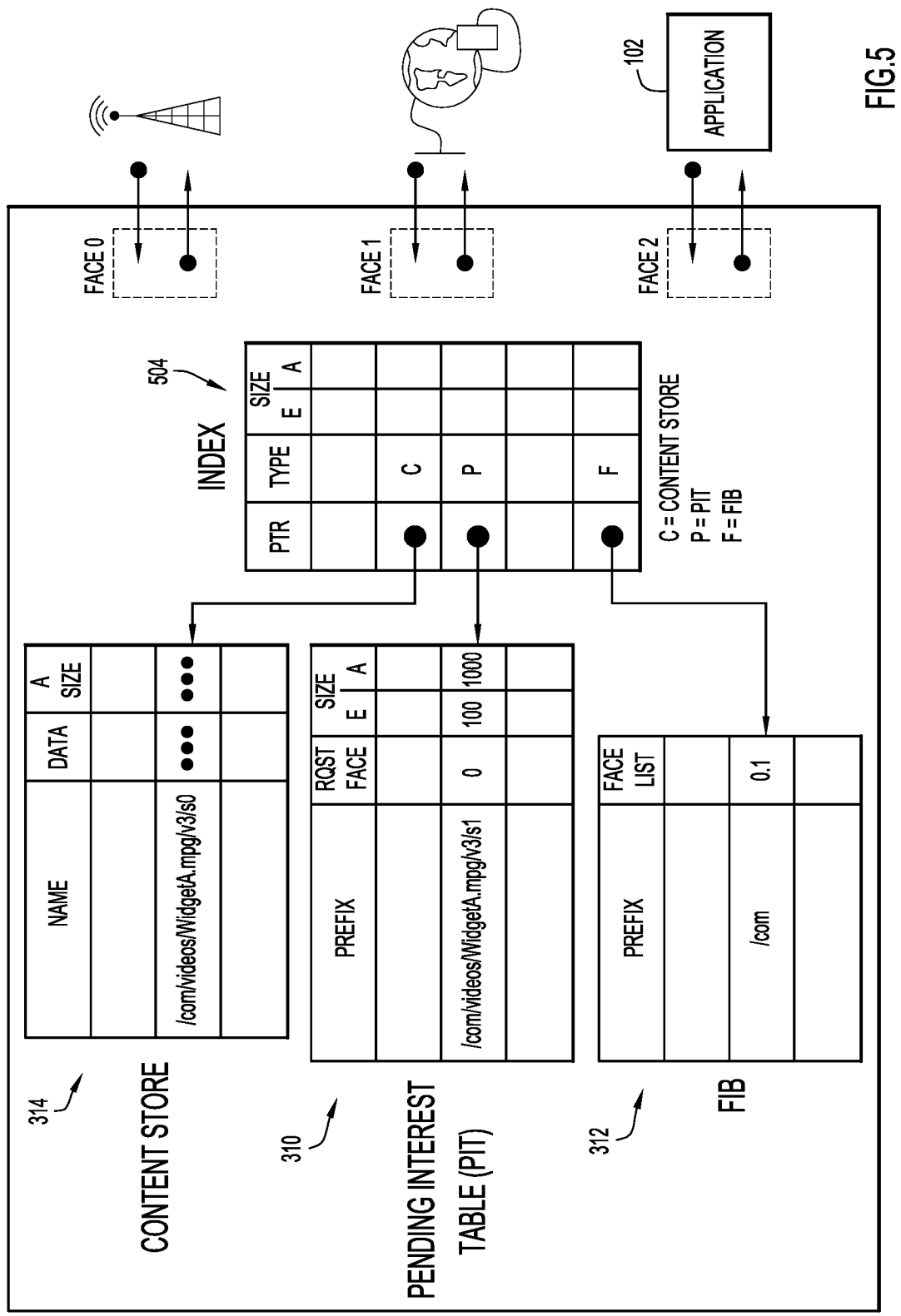
FIG. 5 is a detailed illustration of example data structures corresponding to the NDN network node data structures introduced in FIG. 3, according to an example embodiment.

With reference to FIG. 5, there is depicted a detailed illustration of example data structures corresponding to the NDN node data structures introduced in FIG. 3. Also depicted in FIG. 5 are example NDN node interfaces/faces F0-F2 for receiving and sending Interests and Data to satisfy the Interest. Ingress and egress faces F0-F2 for a given Interest and Data corresponding to that Interest are tracked in PIT 310 and FIB 312.

In PIT 310, each PIT entry, which is populated based on a corresponding Interest, may include a name prefix carried in the Interest, a node interface/face from which the Interest was received, an Expected Data Size (E) carried in the Interest and, if the Interest was satisfied with a returned data object, an Actual Data Size (A) of the data object. Node 300 uses the Expected Data Size specified in an Interest to allocate an appropriate/corresponding level of resources to satisfy the Interest (i.e., setup a link bandwidth and data buffer size for the expected data object0. In certain embodiments, node 300 uses the Actual Data Size of the data object to address mismatches between the Actual Data Size of the data object and the Expected Data Size.

In FIB 312, each FIB entry may include the above-mentioned prefix, a list of node interfaces/faces on which the Interest associated with a given data object name may be forwarded.

In Content Store 314, each entry may include a name of the content in that entry, the data content, and, in some embodiments, an Actual Data Size of the data content, in bytes, for example.

Data structures in NDN node 300 may also include and index 504 that points to corresponding entries for a given Interest/Data in each of Content Store 314, PIT 310, and FIB 312.

Having described NDN node 300 in detail, flow balance embodiments based on Expected Data Size that are implemented in the node are now described in detail. As mentioned above, the Expected Data Size from an Interest can be incorporated in the corresponding Pending Interest Table (PIT) entry of each NDN router 110 (e.g., NDN node 300) on a path traversed by the Interest and hence when a (possibly fragmented) data object is returned on the inverse path, a total size of the data object (i.e., the Actual Data Size) may become known and can be compared to the Expected Data Size in the PIT for a mismatch. In the case of fragmentation, a fragmentation scheme is assumed in which the total data size can be known as soon as any one fragment is received (this is a reasonable assumption for a well-designed fragmentation method).

If the returning data is larger than the Expected Data Size, the extra data could result in either unfair bandwidth allocation or possibly data loss under congestion conditions. When this is detected, in certain embodiments the NDN router has three choices, including:

a. Forwarding the data anyway, which is safe under non-congestion conditions, but unfair and possibly unstable when the output link is congested;

b. Forwarding the data when un-congested (e.g. by assessing output queue depth) but drop it when congested; or c. Dropping the data, as a way of "punishing" the requester for the mis-estimate.

Either of the latter two strategies is acceptable from a congestion control point of view. However, it may be disadvantageous to simply drop the Data message with no feedback to the issuer of the Interest because the application has no way to learn the actual data size and retry. Further, recovery would be delayed until the failing Interest timed out. Therefore, an additional feature of the embodiments presented herein is the incorporation of a "Data Too Big" error message.

In certain embodiments, upon dropping data as above, the NDN router converts the normal Data message into a Data message containing the Data Too Big indication and the actual size of the data object instead of the data object content. The NDN router may propagate that back toward the client identically to how the original Data message would have been handled. Subsequent nodes upon receiving the Data Too Big may process it identically to a regular Data message with the exception that the size of that message is smaller than the Expected Data Size in the corresponding PIT entry. When it eventually arrives back to the issuer of the Interest, the consumer application can reissue the Interest with the correct Expected Data Size.

In certain embodiments, a Data Too Big is deterministically smaller than the Expected Data Size in all cases. This may be the case for large data objects, but may also be the case with small data objects. In certain embodiment, there is a minimum Expected Data Size that a client can specify in their Interest, and that minimum should not be smaller than the size of a Data Too Big response.

Next to be considered is the case where the returning data is smaller than the Expected Data Size. While this case does not result in congestion, it can cause resources to be inefficiently allocated because not all of the set-aside bandwidth for the returning data object gets used. One way to deal with this case is to essentially ignore it. The motivation for not worrying about the smaller data mismatch is that in many situations that employ usage-based resource measurement (and possibly charging), it is also appropriate to just account for the usage according to the larger Expected Data Size rather than actual returned data size. Properly adjusting congestion control parameters to somehow penalize users for over-estimating their resource usage requires fairly heavyweight machinery, which in most cases may not be warranted. If desired, any of the following mechanisms could be employed:

a. Attempt to identify future Interests for the same data object or closely related data objects and allocate resources based on some retained state about the actual size of prior data objects;

b. Police consumer behavior and increase the Expected Data Size in one or more future Interests to compensate; and c. For small data objects, do more optimistic resource allocation on the links on the presumption that there will be some "slack" due to clients overestimating data object size.

One protocol detail of NDN is Interest Aggregation, which may occur when multiple Interests arrive at a router for the same named data object. These Interests may be aggregated such that one of them (e.g., the first one to arrive and create a PIT state) is forwarded, and the rest are dropped while marking the arrival face so the data can be sent back to the multiple requesting clients. Interest aggregation interacts with Expected Data Size if Interests from different clients contain different values of the Expected Data Size. As above, the simplest solution to this problem is to ignore it, as most error cases are benign. However, in some cases one client may provide an accurate estimate data size, but another who issued the Interest first underestimates, causing both to receive a Data Too Big error. This introduces a denial of service vulnerability, which is described below together with the other malicious actor cases.

There are security considerations for malicious actors. First, it is noted that various known attacks in NDN can also be mounted by users employing these embodiments. In certain embodiments, attacks that involve interest flooding, cache pollution, cache poisoning, etc., are neither worsened nor ameliorated by the introduction of this disclosure. The two new vulnerabilities both involve intentional mis-estimation of data size.

The first is a consumer who intentionally over-estimates data size with the goal of preventing other users from using the bandwidth. This may be considered a minor concern given the above discussion of over-estimation by honest clients. If one of the amelioration embodiments above is used, the case of malicious over-estimation may be addressed adequately.

The second is a user who intentionally under-estimates the data size with the goal having its Interest processed while the other aggregated interests are not processed, thereby causing Data Too Big errors and denying service to the other users with overlapping requests. There are a number of possible mitigation embodiments for this attack vector, ranging in complexity. Two are outlined below. There may be other embodiments with acceptable complexity and overhead.

A first mitigation embodiment, which may be the simplest, treats a user sending Interests resulting in Data Too Big errors similarly to a user mounting an interest flooding attack. A router aggregating Interests with differing Expected Data Size rate limits the face(s) exhibiting these errors, thus decreasing the ability of a user to issue enough mis-estimated Interests to collide and generate incorrect Interest aggregation.

A second mitigation embodiment involves a router aggregating Interests that remembers in the PIT entry not only the Expected Data Size of the Interest it forwarded, but the maximum of the Expected Data Size of the other Interests it aggregated. If a Data Too Big error comes back, instead of propagating it the router treats this as a transient error, drops the Data Too Big, and re-forwards the Interest using the maximum Expected Data Size in the PIT (assuming it is bigger). This recovers from the error, but the attacker can still cause an extra round trip to the producer or the router with a copy of the data in its content store.

Adding an explicit estimation of data sizes in NDN (or CCN) Interest-Data protocol operation may allow more sophisticated congestion control, thereby accommodating a larger dynamic range of data object sizes than the existing design. It maintains the crucial property of flow balance in doing so.

In summary, ICN architectures like NDN incorporate the property of flow-balance deeply into their design, analogous to the way TCP/IP embeds the notion of flow rate for transport flows. Given the desirability of retaining this property, conventional NDN protocol allows only PMTU-sized data objects to be carried. This is inconvenient for many applications, and incurs per-message overhead that could be amortized over longer messages. Embodiments presented herein may retain flow balance in NDN while allowing a much greater dynamic range of data object sizes.

The various embodiments described above for implementing flow balance using Expected Data Size are summarized below in methods described below in connection with FIGS. 6-8.

Figure 6:
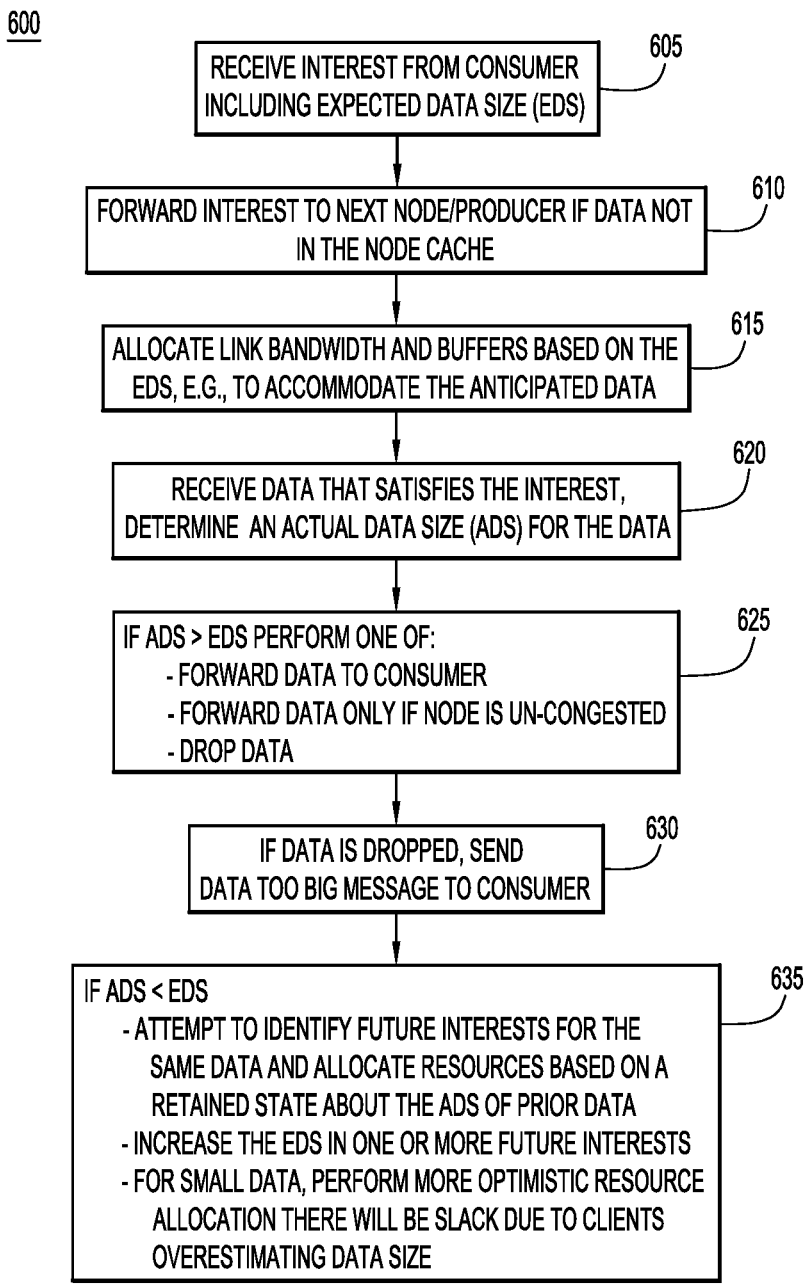
FIG. 6 is a flowchart of a method of handling an Interest in accordance with an Expected Data Size included in the Interest that is performed in the NDN network node, according to an embodiment.

With reference to FIG. 6, there is a flowchart of an example method 600 of handling an Interest in accordance with an Expected Data Size (EDS) included in the Interest that is performed in NDN network node 300 (the "node"). In the ensuing description, the data object and Data packet associated with an Interest are referred to generally as "data."

At 605, the node 300 receives the Interest from a previous node (i.e., downstream node or consumer) that forwarded the Interest to the node 300. The node 300 receives the Interest on an incoming face of the node.

At 610, if the data named in the Interest is not in Content Store 314 as a result of a previous Interest/Data retrieval, the node forwards the Interest to a next node (i.e., an upstream node) along the path toward data producer 104. The node forwards the Interest from an outgoing face of the node. The node stores state information therein in the data structures described above (i.e., PIT 310, and Index 504) that associates the incoming and outgoing faces with that Interest, e.g., using the data name in the Interest. The state information is used later to forward data that satisfies the Interest back to the previous node along a reverse of the path traversed by the Interest.

At 615, the node allocates node resources including link bandwidth and buffers based on the EDS. In an example, the node sets a data rate of the face of on which the data expected to satisfy the Interest is expected to be received based on the EDS, and allocates a size of a buffer in Content Store 314 in which to store the data expected to satisfy the Interest based on the EDS. The node allocates the resources so that the larger the EDS, the larger the data rate and the buffer size that is allocated.

At 620, the node receives data on the reverse path that satisfies the Interest (i.e., the named data) from an upstream node or data producer 104. In an example, the node may receive the data at the outgoing face used to transmit the Interest. The node determines an actual data size (ADS) of the data that satisfies the Interest. To determine the ADS, the node may access a field in the data that specifies the size or, alternatively, may count the bytes of data. The node stores the data in the allocated buffer in Content Store 314 along with the name of the data, and also stores the ADS in the other data structures (i.e., PIT 310 and Index 504).

At 625, the node compares the ADS to the EDS to generate comparison results. If the comparison results indicate that the ADS>EDS, the node performs one or more of the following actions with respect to the data:

a. The node determines whether a level of traffic congestion associated with forwarding the received data toward consumer 102 along the reverse path (e.g., from the incoming face) is below a threshold. In an example, the node may determine if an output queue of data to be forwarded from the incoming face is below a threshold depth (and, therefore, not congested).

i. If the node determines that the level of traffic congestion is below the threshold, the node forwards the data to the requester (i.e., consumer 102) based on the name of the data.

ii. If the node determines that the level of traffic congestion is above the threshold, the node may drop the data (i.e., not forward the data). In this case, the node may instead forward a Data Too Big message to the consumer indicating to the consumer that the ADS is greater than the EDS.

At 635, if the comparison results indicate that the ADS<the EDS, the node may perform any of the following actions with respect to the data:

a. Attempt to identify future Interests (i.e., one or more additional Interests) that request the same data and then allocate node resources based on the retained states about the ADS of prior data. For example, responsive to receiving one or more additional Interests that name the data, the node allocates less network device resources to handle the data expected to satisfy the one or more additional Interests than were previously allocated to handle the data. For example, the node would set a data rate of the face at which the data expected to satisfy the one or more additional Interests is expected to be received to less than the previous data rate. The node would also allocate a size of a buffer in which to store the data expected to satisfy the one or more additional Interests to less than the previously allocated data buffer size;

b. Artificially increase the EDS included in future (i.e., one or more additional) Interests that name the same data, and forward the modified Interest toward data producer 104; and c. For data that is relatively small in size (i.e., with a relatively small EDS and ADS), perform more optimistic node resource allocation.

Figure 7:
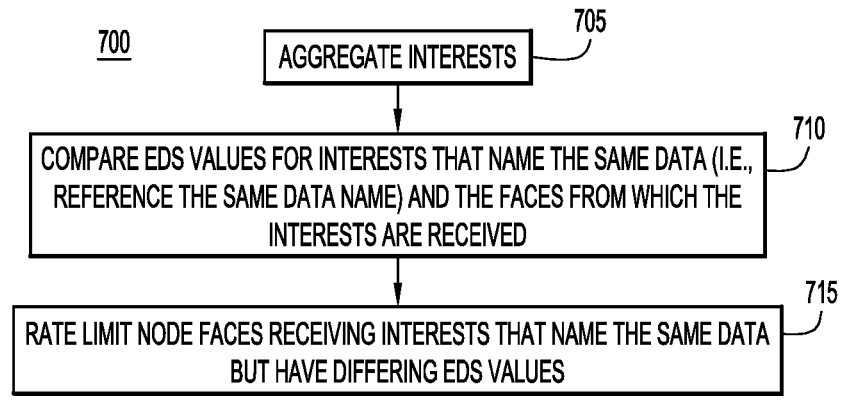
FIG. 7 is a flowchart of a method of handling aggregated Interests to address differing Expected Data Sizes for the same Data that is performed in the NDN network node, according to a first embodiment.

With reference to FIG. 7, there is a flowchart of an example method 700 of handling aggregated Interests to address differing Expected Data Sizes for the same data that is performed in NDN network node 300, according to a first embodiment.

At 705, the node receives multiple Interests at the same face of the node.

At 710, the node determines whether the multiple Interests received at the same face include a same name (i.e., name the same data) but different EDSs.

At 715, if the node determines that the multiple Interests name the same data, but have different EDSs, the node rate limits the face over which Interests with artificially low EDS values are arriving. To do this, the node reduces a data rate supported by the face (i.e., reduces the data rate at which the face operates).

Figure 8:
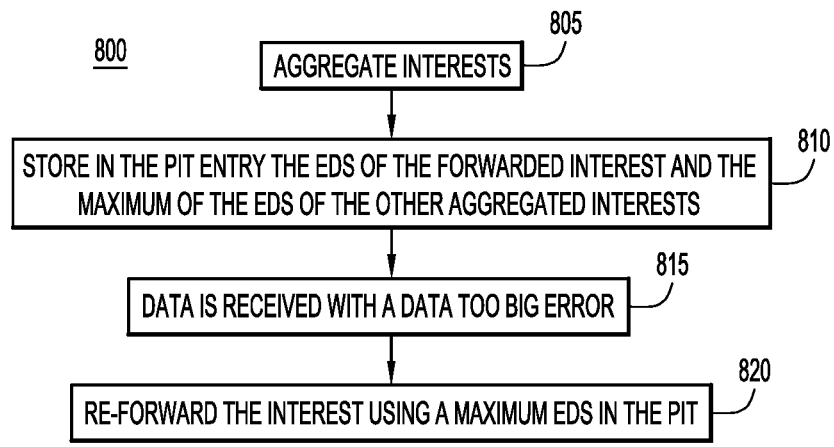
FIG. 8 is a flowchart of a method of handling aggregated Interests to address differing Expected Data Sizes, according to a second embodiment.

With reference to FIG. 8, there is a flowchart of an example method 800 of handling aggregated Interests to address differing Expected Data Sizes, according to a second embodiment.

At 805, the node receives multiple Interests including a same name but different EDSs.

At 810, the node forwards one of the multiple Interests along a path to data producer 104. The node also stores a maximum one of the different EDSs in the PIT.

At 815, responsive to the forwarded one of the multiple Interests, the node receives a Data Too Big message (from an upstream node, i.e., from the reverse path), instead of data expected to satisfies that Interest, indicating that the actual data size is less than the EDS associated with the forwarded Interest.

At 820, responsive to the Data Too Big message, the node re-forwards the one of the multiple Interests, but modified so as to include the maximum EDS. Alternatively, the Data Too Big is forwarded back downstream toward the consumer.

Figure 9:
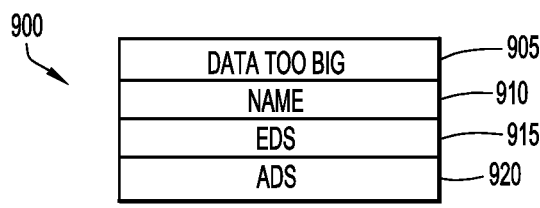
FIG. 9 is an illustration of an example Data Too Big message generated by the NDN node, according to an example embodiment.

With reference to FIG. 9, there is an illustration of an example Data Too Big message 900 generated by NDN node 300. Data Too Big message 900 includes a header 905 indicating that the message is a Data Too Big message, a name 910 of the data with which the message is associated (i.e., that satisfied the Interest), an EDS 915 from the associated Interest, and an ADS 920 of the data.

Adding an explicit estimation of data sizes in NDN (or CCN) Interest-Data protocol operation may allow more sophisticated congestion control, thereby accommodating a larger dynamic range of data object sizes than the existing design.

In summary, ICN architectures like NDN incorporate the property of flow-balance deeply into their design, analogous to the way TCP/IP embeds the notion of flow rate for transport flows. Given the desirability of retaining this property, conventional NDN protocol allows only PMTU-sized data objects to be carried. This is inconvenient for many applications, and incurs per-message overhead that could be amortized over longer messages. Embodiments presented herein may retain flow balance in NDN while allowing a much greater dynamic range of data object sizes.

In summary, in one form, a method is provided comprising: at a network device among network devices configured to perform named data networking (NDN) in an NDN network: receiving an Interest from a consumer, the Interest requesting data by name and including an expected data size of the requested data; forwarding the Interest along a path to a producer of the data based on the name; obtaining received data that has traversed the path in reverse and satisfies the forwarded Interest; determining an actual data size of the received data; comparing the actual data size to the expected data size; and if the comparing indicates the actual data size is greater than the expected data size, and if a level of traffic congestion associated with forwarding the received data to the consumer is below a threshold, forwarding the received data to the consumer along a path based on the name of the data.

In another form, an apparatus is provided comprising: multiple network faces to send and receive named data networking (NDN) packets to and from an NDN network; a processor coupled to the multiple network faces and configured to: receive multiple Interests at a face among the multiple faces, each Interest requesting data by name and including an expected data size of the requested data; determine whether the multiple Interests include the same name but different expected data sizes for the data; and if the multiple Interests include the same name but different expected data sizes for the data, perform an action with respect to the multiple Interests.

In yet another form, a computer program product is provided. The computer program product includes computer readable storage media encoded with instructions that, when executed by a processor of a network device configured to perform named data networking (NDN) in an NDN network, cause the processor to: receive multiple Interests at a face among multiple faces of the network device, each Interest requesting data by name and including an expected data size of the requested data; determine whether the multiple Interests include the same name but different expected data sizes for the data; and if the multiple Interests include the same name but different expected data sizes for the data, perform an action with respect to handling the multiple Interests.

The above description is intended by way of example only.

What is claimed is:

1. A method comprising:
    at a network device among network devices configured to perform named data networking (NDN) in an NDN network:
        receiving an Interest from a consumer, the Interest requesting data by name and including an expected data size of the requested data;
        responsive to receiving the Interest, allocating network device resources to handle the data expected to satisfy the Interest based on the expected data size;
        forwarding the Interest along a path to a producer of the data based on the name;
        obtaining received data that has traversed the path in reverse and satisfies the forwarded Interest;
        determining an actual data size of the received data;
        comparing the actual data size to the expected data size;
        if the comparing indicates the actual data size is greater than the expected data size, and if a level of traffic congestion associated with forwarding the received data to the consumer is below a threshold, forwarding the received data to the consumer along a path based on the name of the data; and
        if the comparing indicates the actual data size is less than the expected data size, responsive to receiving one or more additional Interests that name the data, allocating less network device resources to handle the data expected to satisfy the one or more additional Interests than were previously allocated to handle the data expected to satisfy the Interest.

2. The method of claim 1, further comprising:
    storing state information that associates incoming and outgoing faces of the network device traversed by the Interest with the name of the data to enable forwarding of the Interest along the path to the producer and the forwarding of the received data along the path in reverse to the consumer; and
    storing the expected data size in association with the state information.

3. The method of claim 1, further comprising, if the comparing indicates the actual data size is greater than the expected data size:
    determining whether the level of traffic congestion associated with forwarding the received data to the consumer is below the threshold; and
    if it is determined that level of traffic congestion is below the threshold, performing the forwarding the received data to the consumer along the path based on the name of the data.

4. The method of claim 3, further comprising: if it is determined that the level of traffic congestion is above the threshold, dropping the received data and forwarding a message indicating that the actual data size is greater than the expected data size along a reverse path to the consumer.

5. The method of claim 1, further comprising:
    receiving multiple Interests at a face of the network device;
    determining whether the multiple Interests received at the face include a same name but different expected data sizes for the data; and
    if it is determined that the multiple Interests received at the face include the same name but different expected data sizes for the data, reducing a data rate at which the face operates.

6. The method of claim 1, further comprising:
    receiving multiple Interests including a same name but different expected data sizes;
    forwarding one of the multiple Interests;
    storing a maximum one of the different expected data sizes;
    responsive to the forwarded one of the multiple Interests, receiving an error message, instead of receiving data satisfying that Interest, the error message indicating that the actual data size is less than the expected data size; and
    responsive to the error message, re-forwarding the one of the multiple Interests modified to include the maximum expected data size.

7. An apparatus comprising:
    multiple network faces to send and receive named data networking (NDN) packets to and from an NDN network; and
    a processor coupled to the multiple network faces and configured to:
        receive multiple Interests at a face among the multiple faces, each Interest requesting data by name and including an expected data size of the requested data;
        determine whether the multiple Interests include the same name but different expected data sizes for the data; and
        if the multiple Interests include the same name but different expected data sizes for the data:
            forward one of the multiple Interests;
            store a maximum one of the different expected data sizes;
            responsive to the forwarded one of the multiple Interests, receive an error message, instead of receiving data satisfying the one of the multiple Interests, the error message indicating that the actual data size is less than the expected data size; and
            responsive to the error message, re-forward the one of the multiple Interests modified to include the maximum expected data size.

8. The apparatus of claim 7, wherein the processor is further configured to:
    store state information that associates incoming and outgoing ones of the multiple faces traversed by at least one Interest among the multiple Interests with the name of the data in the at least one Interest to enable forwarding of the at least one Interest along a path to a producer of the data and then forwarding of the data, when received from the producer, along the path in reverse to a consumer that originated the at least one Interest; and store the expected data size in association with the state information.

9. The apparatus of claim 7, wherein the processor is further configured to, if the multiple Interests include the same name but different expected data sizes for the data, reduce a data rate at which the face operates.

10. The apparatus of claim 7, wherein the processor is further configured to:
forward at least one Interest among the multiple Interests along a path to a producer of the data requested by the name in the at least one Interest based on the name;
obtain received data that has traversed the path in reverse and satisfies the forwarded at least one Interest;
determine an actual data size of the received data;
compare the actual data size to the expected data size; and
perform an action with respect to the received data based on the compare.

11. The apparatus of claim 10, wherein the processor is further configured to:
store state information that associates incoming and outgoing ones of the multiple faces traversed by the at least one Interest with the name of the data to enable forwarding of the at least one Interest along the path to the producer and the forwarding of the received data along the path in reverse to a consumer that originated the at least one Interest; and
store the expected data size in association with the state information.

12. The apparatus of claim 10, wherein, if the compare indicates the actual data size is greater than the expected data size, the processor performs the action with respect to the received data by:
determining whether a level of traffic congestion associated with forwarding the received data to a consumer that originated the at least one Interest is below a threshold; and
if the level of traffic congestion is below the threshold, forwarding the received data to the consumer along a path based on the name of the data.

13. The apparatus of claim 10, wherein the processor is further configured to:
responsive to receiving the at least one Interest among the multiple Interests, allocate network device resources to handle the data expected to satisfy the at least one Interest based on the expected data size; and
if the compare indicates the actual data size is less than the expected data size, responsive to receiving one or more additional Interests that name the data, allocate less network device resources to handle the data expected to satisfy the one or more additional Interests than were previously allocated to handle the data expected to satisfy the at least one Interest.

14. A non-transitory tangible computer readable storage media encoded with instructions that, when executed by a processor of a network device configured to perform named data networking (NDN) in an NDN network, cause the processor to:
receive multiple Interests at a face among multiple faces of the network device, each Interest requesting data by name and including an expected data size of the requested data;
determine whether the multiple Interests include the same name but different expected data sizes for the data; and if the multiple Interests include the same name but different expected data sizes for the data:
forward one of the multiple Interests;
store a maximum one of the different expected data sizes;
responsive to the forwarded one of the multiple Interests, receive an error message, instead of receiving data satisfying the one of the multiple Interests, the error message indicating that the actual data size is less than the expected data size; and
responsive to the error message, re-forward the one of the multiple Interests modified to include the maximum expected data size.

15. The computer readable storage media of claim 14, further including instructions to cause the processor to:
store state information that associates incoming and outgoing ones of the multiple faces traversed by at least one Interest among the multiple Interests with the name of the data in the at least one Interest to enable forwarding of the at least one Interest along a path to a producer of the data and then forwarding of the data, when received from the producer, along the path in reverse to a consumer that originated the at least one Interest; and
store the expected data size in association with the state information.

16. The computer readable storage media of claim 14, further comprising instructions to cause the processor to, if the multiple Interests include the same name but different expected data sizes for the data, reduce a data rate at which the face operates.

17. The computer readable storage media of claim 14, further comprising instructions to cause the processor to:
forward at least one Interest among the multiple Interests along a path to a producer of the data requested by the name in the at least one Interest based on the name;
obtain received data that has traversed the path in reverse and satisfies the forwarded at least one Interest;
determine an actual data size of the received data;
compare the actual data size to the expected data size; and
perform an action with respect to the received data based on the compare.

18. The method of claim 2, wherein:
the storing the state information includes storing the state information in a pending interest table; and
the storing the expected data size includes storing the expected data size in the pending interest table.

19. The apparatus of claim 8, wherein the processor is configured to:
store the state information in a pending interest table; and
store the expected data size in the pending interest table.

20. The computer readable storage media of claim 15, wherein:
the instructions to cause the processor to store the state information include instructions to cause the processor to store the state information in a pending interest table; and
the instructions to cause the processor to store the expected data size include instructions to cause the processor to store the expected data size in the pending interest table.

* * * * *